United States Patent [19]

Eggers et al.

[11] Patent Number: 4,920,432
[45] Date of Patent: Apr. 24, 1990

[54] SYSTEM FOR RANDOM ACCESS TO AN AUDIO VIDEO DATA LIBRARY WITH INDEPENDENT SELECTION AND DISPLAY AT EACH OF A PLURALITY OF REMOTE LOCATIONS

[76] Inventors: Derek C. Eggers; David V. Holben, both of 4217 Highland Rd., Suite 275, Pontiac, Mich. 48054; Mark E. Robinson, 1080 Cliff Dr., Lapeer, Mich. 48446

[21] Appl. No.: 143,575

[22] Filed: Jan. 12, 1988

[51] Int. Cl.$^5$ .................. H04N 5/78; H04N 7/16; G11B 15/68
[52] U.S. Cl. .................. 360/33.1; 360/71; 360/92; 364/514; 358/86; 358/84; 455/4; 455/5
[58] Field of Search .............. 360/33.1, 92, 35.1, 360/71; 358/343, 86, 102; 455/4–5

[56] References Cited

U.S. PATENT DOCUMENTS

| | | | |
|---|---|---|---|
| 3,050,579 | 8/1962 | Nash et al. | 358/102 |
| 3,881,053 | 4/1975 | Lemelson | 358/102 |
| 4,028,733 | 6/1977 | Ulicki | 360/35.1 |
| 4,133,013 | 1/1979 | Fisher | 360/92 |
| 4,275,425 | 6/1981 | Watanabe et al. | 360/92 |
| 4,295,154 | 10/1981 | Hata et al. | 358/86 X |
| 4,381,522 | 4/1983 | Lambert | 358/86 |
| 4,518,989 | 5/1985 | Yabiki et al. | 358/86 |
| 4,622,610 | 11/1986 | Makigawa | 360/92 |
| 4,644,425 | 2/1987 | Tamaki | 360/92 X |
| 4,731,682 | 3/1988 | Nishiyama et al. | 360/92 |
| 4,734,765 | 3/1988 | Okada et al. | 358/102 |
| 4,757,371 | 7/1988 | Nozawa et al. | 358/86 |
| 4,761,684 | 8/1988 | Clarke et al. | 358/86 |
| 4,772,968 | 9/1988 | Nonaka et al. | 360/92 |
| 4,779,129 | 10/1988 | Uee et al. | 358/86 |

OTHER PUBLICATIONS

"Automatic Storage and Retrieval of Videotaped Programs"; Kazama et al SMPTE Journal, Apr. 1979, vol. 88, pp. 221–223.

*Primary Examiner*—Aristotelis M. Psitos
*Attorney, Agent, or Firm*—John R. Benefiel

[57] ABSTRACT

Adapted for use in hotels, hospitals, and similar environments, the disclosed system allows numerous system users to operate user terminals at any of a plurality of locations to access a common library of audio-video data contained on a collection of record items such as, video tape cartridges, stored in a housing located at a remote central location. Using a computer controlled filer, the system retrieves a data record item from an array of housing storage sites at each user's request, loading the same into one of a plurality of playback devices also located at the central location, from which the audio video signal is directed to the user's terminal for readout. Each user may also access local television, radio, satellite video, and any other optional signal source connected to the system. System software running on a system supervisor computer processes user requests and controls the filer and the play back devices, while customized software that runs on each user terminal provides a user interface for interacting with the system supervisor computer. A multifrequency signal modulator and combiner system allows tuning of each user terminal to the signal from a particular play back device.

3 Claims, 14 Drawing Sheets

VIDEO PROGRAM NAMES

| | |
|---|---|
| 1 | ALPHA PROGRAM |
| 2 | BRAVO PROGRAM |
| 3 | CHARLIE PROGRAM |
| 4 | DELTA PROGRAM |
| 5 | ECHO PROGRAM |
| ... | ... |
| N-1 | YANKEE PROGRAM |
| N | ZULU PROGRAM |

VIDEO PROGRAM TABLE

FIG. 4

| TERMINAL ID # | REQUEST (B, E, etc) | VIDEO PROGRAM # |
|---|---|---|
|  |  |  |
|  |  |  |
|  |  |  |
|  |  |  |
|  |  |  |

JOB REQUEST QUEUE FILE

FIG. 5

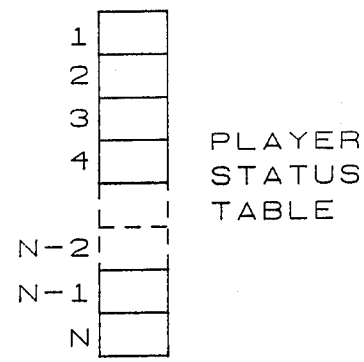
SEGMENT LOCATIONS TABLE
FIG. 6
PLAYER STATUS TABLE
FIG. 8
PLAYER LOCATIONS TABLE
FIG. 9
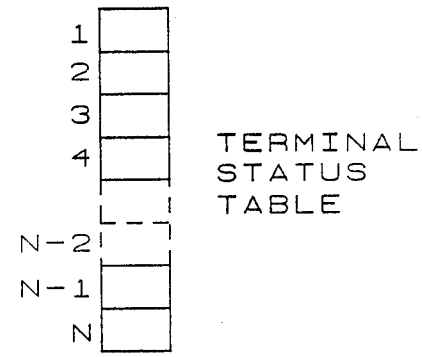
CARTRIDGE STATUS TABLE
FIG. 7
TERMINAL STATUS TABLE
FIG. 10

SYSTEM FOR RANDOM ACCESS TO AN AUDIO VIDEO DATA LIBRARY WITH INDEPENDENT SELECTION AND DISPLAY AT EACH OF A PLURALITY OF REMOTE LOCATIONS

BACKGROUND OF THE INVENTION

This invention concerns playback of audio-video data, and more particularly playback of audio-video data selected from a library of prerecorded discrete data record itsms such as video cartridges.

There has long been provided random access to a library of prerecorded audio data for playback of a selected item, i.e., the "juke box" allowed playback of any of the records stored in the machine.

This concept has been recently extended to audio-video data stored on tape cartridges, as described in U.S. Pat. No. 4,647,989 issued on March 3, 1987.

Access to data stored on discrete record items for other purposes has also heretofore been accomplished, as in U.S. Pat. No. 4,608,679 issued on August 26, 1986, in which a mechanical retrieval device removes and transports cartridges from a stored array for playback of selective portions of prerecorded data.

U.S. Pat. No. 3,947,882 discloses a vending system for remotely accessible stored information, for the purpose of obtaining recordings from a central library.

U.S. Pat. No. 3,609,227 discloses a system for random access to an audio-video data library from a plurality of terminals in which playback is achieved by individual playback devices associated with each terminal.

U.S. Pat. No. 4,133,013 discloses a multiple player video cassette selection system, but this system does not appear to provide for selection and display at a plurality of remote locations.

There is a need for selective access to prerecorded audio-video data from a common library in which selection and display may be at any of a plurality of remote locations. Such need is found for example in providing information and entertainment to occupants of hotels, hospitals, and the like, in which access to prerecorded video data from each room would allow this service to be rendered. That is, an occupant could select a given movie from a library for viewing; or perhaps an informational tape segment on local restaurants, events, shopping and the like.

It would be impractical to transfer data to individual players in each room as in U.S. Pat. No. 3,609,227 due to the time required for transfer of massive amounts of data involved, and an excessive expense would be entailed in providing and maintaining players in each room, considering that only a small fraction of their number would be in use at any given time.

SUMMARY OF THE INVENTION

The present invention provides random access to a library of prerecorded audio-video data stored on a plurality of discrete record items, in which selection and display are accomplished at any of a plurality of remote locations.

This is accomplished by a system comprising a central stored array of such record items and a limited number of playback devices at the central location.

Each remote location is provided with a display terminal and a processor with software enabling selection of a given segment of audio video data.

A mechanical filer is operated in response to a user request by a system supervisor processor to cause a given record item to be removed from storage and played in an available playback unit, in which a carriage tray adapted to hold one or more record items is moved in X, Y and Z axes between oppositely disposed planar arrays of storage sites and playback machines. A retriever device, capable of holding several items at once, extracts or deposits an item from or into a carriage cavity after the carriage moves to a storage site or playback device. The retriever device comprises a pair of spaced belts disposed along the carriage cavity and protruding slightly therefrom, the belts driven to advance an item into or out of the carriage cavity.

The supervisor computer causes reception of the selected video signal by the appropriate display terminal over a common cable network by tuning the terminal to a given signal frequency.

DESCRIPTION OF THE DRAWINGS

FIG. 4 is a table containing the names of the video programs loaded into the filer system.

FIG. 5 is a table showing the Job Request Queue File, which is made up of records of three fields, i.e., the terminal I.D. number, the request code, and the video program number.

FIG. 6 is a table storing segment access information on each video data segment in the system.

FIG. 7 is a table representing the cartridge status, keeping track of each cartridge's current activity, whether not in use (available) or assigned to a player (not available).

FIG. 8 is a table indicating the player status.

FIG. 9 is a player location table, allowing the system software to look up the Cartesian coordinate of any video cartridge player for access by the video filer.

FIG. 10 is a terminal status table, storing the current activity status for all user terminals.

DETAILED DESCRIPTION

In the following detailed description, certain specific terminology will be employed for the sake of clarity and a particular embodiment described in accordance with the requirements of 35 USC §112, but it is to be understood that the same is not intended to be limiting and should not be so construed inasmuch as the invention is capable of taking many forms and variations within the scope of the appended claims.

Figure 1:
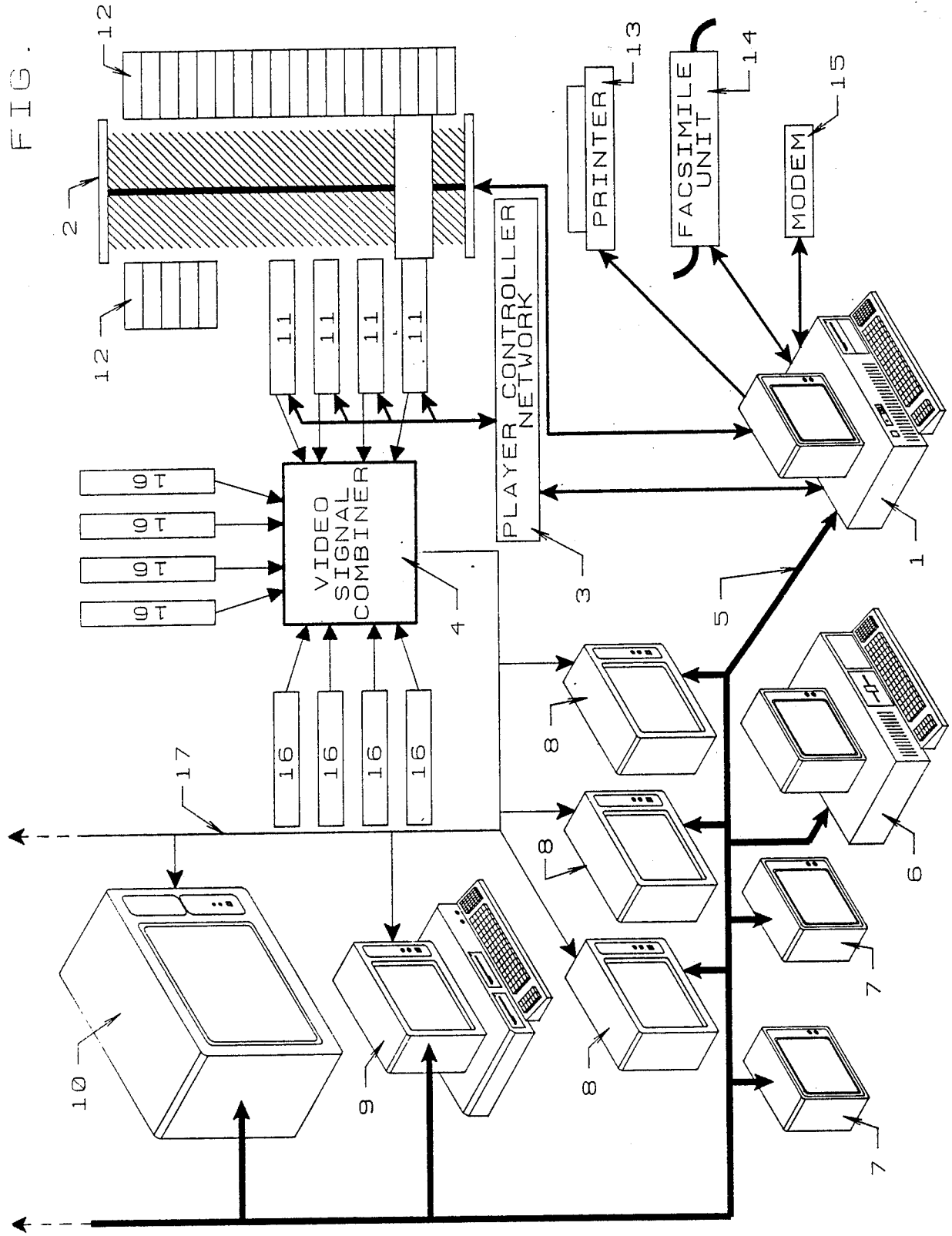
FIG. 1 is a system diagram showing the major components and their interconnections.

The system according to the present invention is depicted diagrammatically in FIG. 1, and includes a system supervisor computer 1, which comprises a state-of-the-art (fast, high capacity) microcomputer including a display monitor, 1a keyboard 1B, disk drives 1C, and various interfaces (adapters) and peripherals. Besides the adapters for the monitor and disk drives 1c, other internal interfaces include the interface to the video filer 2, the player controller network 3, and the local area network server adapter, described hereinafter. Although numerous types of peripherals may be added to the system supervisor computer; the most common input/output devices will include one or more printers 13, modems 15, and facsimile devices 14.

Because of the necessity for sufficient capacity to include multitasking programs, the system supervisor computer 1 comprises a fast CPU microprocessor, such as the Intel 80286 or the Intel 80386, and configured with a large amount of RAM (random access memory), which will contain the running system supervisor software, memory-based disk emulators, and input/output device buffers.

The video filer 2 is a microprocessor controlled mechanical storage and retriever device that transports discrete data record items, i.e., video cartridges between a rectangular array of storage sites 12 open on one side, and an adjacent array of playback devices 11. The filer's cartridge carriage 2A moves along two orthogonal axes in a vertical plane parallel to the array of storage sites 12 and players 11, i.e., left, right; and up, down. The left/right and up/down movements position the carriage 2A opposite one of the storage sites 12 or the players 11 as necessary to mount and dismount data record items from a player 11 or site 12. From the carriage 2A, a holder tray (not shown in FIG. 1) extends to a cartridge player 11 or storage site 12, with a retriever mechanism (not shown), inserting or retracting a cartridge as will be described hereinafter in more detail. A large system may consist of more than one video filer 2; other video filers in the system could then provide access to other video cartridge types.

The system supervisor computer 1 indirectly controls the players 11 by way of the player controller network 3. To send an instruction, the system supervisor computer sends a player ID number followed by a seek command to the player controller network 3. The seek command includes the segment position and length. The player controller network 3 actually operates the player 11 requested by the system supervisor computer 1 by control signals transmitted over a player cable network 3A.

All of the video cartridge players 11 and other signal sources 16 which may be included direct their video signals to a video signal combiner 4, which modulates and combines all signals onto unique frequencies on a single or few cables 17 depending both on the total number of video signals and on the type of cable used.

A local area network (LAN) is a well known data communications system that provides common access to peripherals such as disk drives and printers to multiple personal computers comprising a user terminal 8. Each user terminal 8 has network station software, and a network interface adapter, which communicates with other system devices through a cable such as coax and-/or fiber optic lines 5. The system supervisor computer 1 acts as the network server; that is, its network adapter and software provide the other computers in the network i.e. user terminals 8 with access to the supervisor computer, printer 13, and other peripherals such as the facsimile unit 14.

Any of several local area network configurations may be used with the system according to the present invention. The choice depends on the environment, size (number of user terminals), and shape (relative locations of user terminals) of the system. Possible configurations include carrier sense multiple access with collision detection (CSMA/CD); bus LANs (IEEE standard 802.3); token passing bus LAN (IEEE standard 802.4); metropolitan area networks using CATV technology (being developed as IEEE standard 802.3); token passing bus technology (being developed as IEEE standard 802.6); and broadband networks (IEEE 802.7). Those skilled in the art can choose the appropriate network configuration for a given system. For example, Ethernet by Xerox is a fast (10 Mbps) CSMA/CD bus LAN using baseband. Repeaters may be used to extend the length of cables used, thus extending the size and shape of the network.

Often operated solely by the system operator, a master user terminal 6 may comprise a complete personal computer system with its own hard disk drive, printer (not shown in FIG. 1), and other peripherals, including a complete keyboard 8G, and network interface adapter (not shown in FIG. 1).

The master user terminal 6 is available to run customized software depending on the needs of a particular installation; this computer, for example, may run accounting software to charge users for system access; the system operator, the most privileged user, may authorize access only to certain users. The master user terminal 6 can monitor the activities of all other users and system resources connected to the network, such as message monitors 7 (or message printers) which are output devices only. Like the master user terminal 6, their functions depend on the application of the system. In a hotel, for example, these devices may inform room service that a guest has placed a food order.

The typical user terminal 8 consists of a personal computer with a color graphics monitor 8A capable of displaying both full motion and computer generated video, a user input device 8B, a video signal tuner (not shown), a local area network station interface (not shown), and optional external expansion ports 8M. The user terminal 8 is capable of running any software on the local area network unless access to certain programs or data is restricted by the system operator. To view video, the user will run a user-interface program which allows the user to request the system to play any video segment on his or her monitor. On some systems, the user-interface program may be the only software a user is allowed to run. The user controls the terminal software with the input device, which may be a small keypad 8B or some other means of input. A video signal tuner is incorporated to demodulate a video signal from the system's video cable 17 to be displayed. The frequency of the signal it demodulates is assigned by the system supervisor computer 1. The network station interface facilitates the transfer of data (user requests, system responses, etc.) between the user terminal 8 and the system supervisor computer 1.

Optional external expansion ports 8M on each user terminal 8 provide means of connecting optional devices such as full-function alphanumeric keyboards 8G, diskette drives 8H, graphics input devices, game controllers 8I, IR remote control receiver 8J.

Large public access versions 10 of the user terminal differ only in the size of the video screen. It is likely, however, that some capabilities of the smaller user terminals 8 will be prohibited (via software) on a public access unit. The public access terminals 10 can be equipped with a coin or currency collection device to require payment for usage (not shown).

Although several types of audio-video data record items exist, each filer 2 will be designed for a particular type such as video discs, video tapes, or compact discs. The players 11 take commands from both the player controllers 3 and the video filer 2. Each player controller 3 controls the drive motors and read heads of its player 11, and the filer 2 instructs the players 11 to accept or eject cartridges.

Designed for the type of media cartridge in use, the storage sites 12 contain video cartridges not in use; their configuration facilitates access by the video filer 2 by allowing protusion of one end of the cartridge.

The system printer 13 produces reports for the system operator and any other user if authorized by the system operator. If user access is permitted, a printer queue program on the system supervisor performs user printing requests on a FIFO (first in, first out) or a priority basis (determined by user privilege level or document size, for example). More than one printer may be attached to a system as different types of printers serve different purposes. Other output devices such as plotters (not shown) can be interfaced with the system, as well.

As facsimile becomes more common as a business communications tool, it will become more necessary as a peripheral on computer systems. Interfaced to the system supervisor computer, the facsimile adapter and scanner unit 14 can read or transmit not only computer text and graphics, but also printed and even hand-written information. Like the system printer(s), a system supervisor queue program coordinates user requests of the users for the unit 14.

Connected to one of the system supervisor computer's serial interface ports, the modem 15 can communicate with other computers. Since the transfer of data and programs has become quite common over telephone lines, access to many thousands of on-line databases and bulletin boards is available to any user with access to a modem. Like the other system input/output peripherals, a system supervisor queue program will coordinate user requests to use the modem 15, if the system operator allows user access.

Optional signal sources 16 to the system include television and radio broadcasts, satelite transmissions, and closed circuit television. Like the video players 11 each signal source 16 has an I.D. number which correlates with a video signal channel (unique frequency) to enable display or read out over a single cable 17 to all of the user terminals 8, 10.

The video cable 17 extends from the video signal combiner 4 to each user terminal 8, 10. This cable may be video grade coax or fiber optic, which can be determined by the system designer or anyone else skilled in the art. Optionally, the LAN data may be incorporated into dedicated data channels on the video cable instead of transmitting on a separate network coax.

Figure 2:
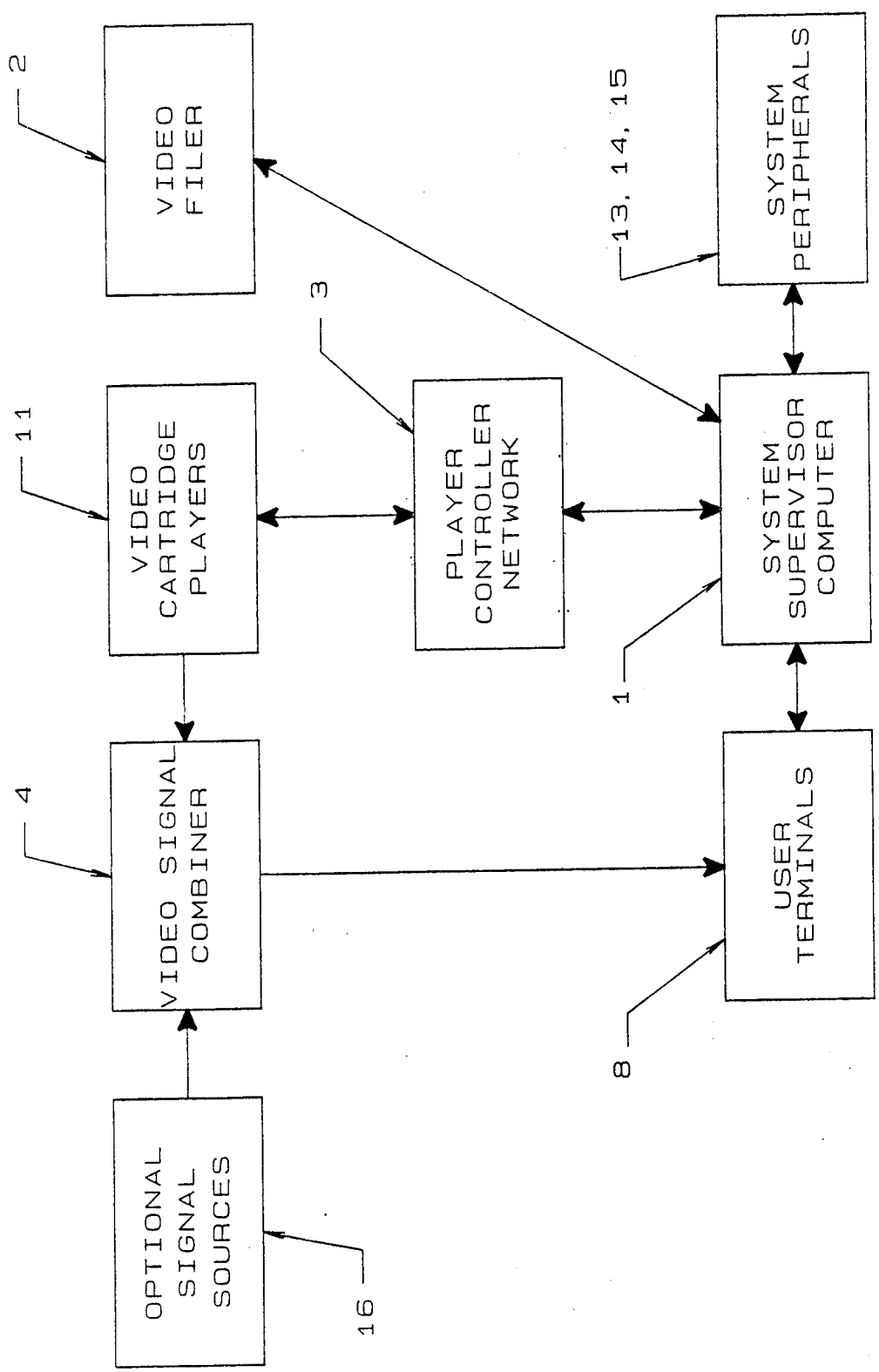
FIG. 2 is a block diagram, indicating the data, control and audio-video signal flow paths through the system.

Referring to FIG. 2, the transmission of signals between the components may be understood. Each user terminal 8 transmits requests to the system supervisor computer 1 through the LAN. The user terminal software, which writes its video requests to a file on the system supervisor computer's hard disk, indicates the video program number of the desired segment. The video program number represents not a particular video cartridge but a particular video segment of unrestricted length on a cartridge.

Also through the LAN, the system supervisor computer 1 responds to the user terminals 8 with reports on the status of processing. When a user has requested a video segment to be shown and the filer 2 has inserted the appropriate video cartridge in an available player 11, the supervisor 1 indicates the frequency that the user terminal 8 should tune in order to display the requested video signal.

Each user terminal 8 has a terminal message file with a unique name based on its terminal I.D. number. The system supervisor computer writes messages to this file; when the file does not exist, it is created. The user terminal software reads the messages, deletes the message file, and responds as directed by the system supervisor computer.

The system supervisor computer 1 sends commands to the filer 2. The command, which starts with a player number, includes the Cartesian coordinate locations both of the player 11 and of the cartridge storage site 12 in the array of sites 12 and players 11; it also indicates whether the cartridge is to be mounted or to be dismounted.

By causing an interrupt, the filer 2 reports back a simple status message to the supervisor 1. The message created by the interrupt handler notifies the supervisor 1 of success or failure of the last operation so that the supervisor 1 can react appropriately.

The system supervisor computer 1 indirectly controls the video players 11 by sending commands to the player 11 as identified by the player's video player controller network I.D.

The player controller network 3 uses an interrupt to report a simple status message to the supervisor. Created by the interrupt handler routine, the message notifies the supervisor 1 of success or failure of the operation so that the supervisor can react appropriately.

The player controller network 3 controls the players 11 as instructed by the system supervisor. The network 3 monitors the activities of the players 11 by continuously monitoring the status of each player 11.

The system supervisor computer 1 communicates directly with its input/output peripherals (printer, 13, modem 15, facsimile 14, etc.) System software may control a queue of requests to use the peripherals by the users.

The video cartridge players 11 direct their output to the video signal combiner 4.

Like the cartridge players 11, other signal sources 16 also direct their video signal output to the video signal combiner 4.

The video signal combiner 4 directs the outputs of all of the signal sources, including players 11, to the user terminals 8 by way of a video cable 17. The user terminals 8 tune to assigned frequencies to view the requested videos.

An explanation of the processing involved in performing a user request will demonstrate the data and video signal flows throughout the system. With the prompting of the terminal software, the user may select a video segment from a list on the user terminal screen 8A. The user terminal 8 sends the identification number of the selected video program to a queue file on the system supervisor computer hard disk 1c; the LAN provides the user terminal with the ability to write requests to the job request queue file on the system supervisor's hard disk 1c.

The system supervisor computer 1, which processes requests as they appear in the request queue, checks the availability of the necessary resources. After looking up the segment location data in an interal table, it ensures that the cartridge that contains the segment is in its shelf, and thus, not in use. It then scans the player status table to find an inactive cartridge player.

If both the cartridge and a player 11 are available, the system supervisor computer 1 commands the filer 2 to retrieve the cartridge and mount it in the selected player 11. Upon confirmation from the filer 2 that the tape was successfully mounted, the system supervisor instructs the player controller network 3 to prepare the selected player to play the requested segment. When the player controller network 3 indicates that the player 11 is ready, the system supervisor 1 provides the user terminal 8 with a channel (unique frequency) to tune, and it commands the player 11 to begin play. This channel number is based on the player's unique I.D. number. When the user terminal 8 begins receiving a video signal, the terminal software allows the video to be displayed on the monitor 8a.

The user's terminal 8 displays the video until segment completion or user interruption. Upon completion or interruption, the system commands the filer 2 to dismount the cartridge, and it relinquishes access to both the cartridge and the player 11.

Figure 3:
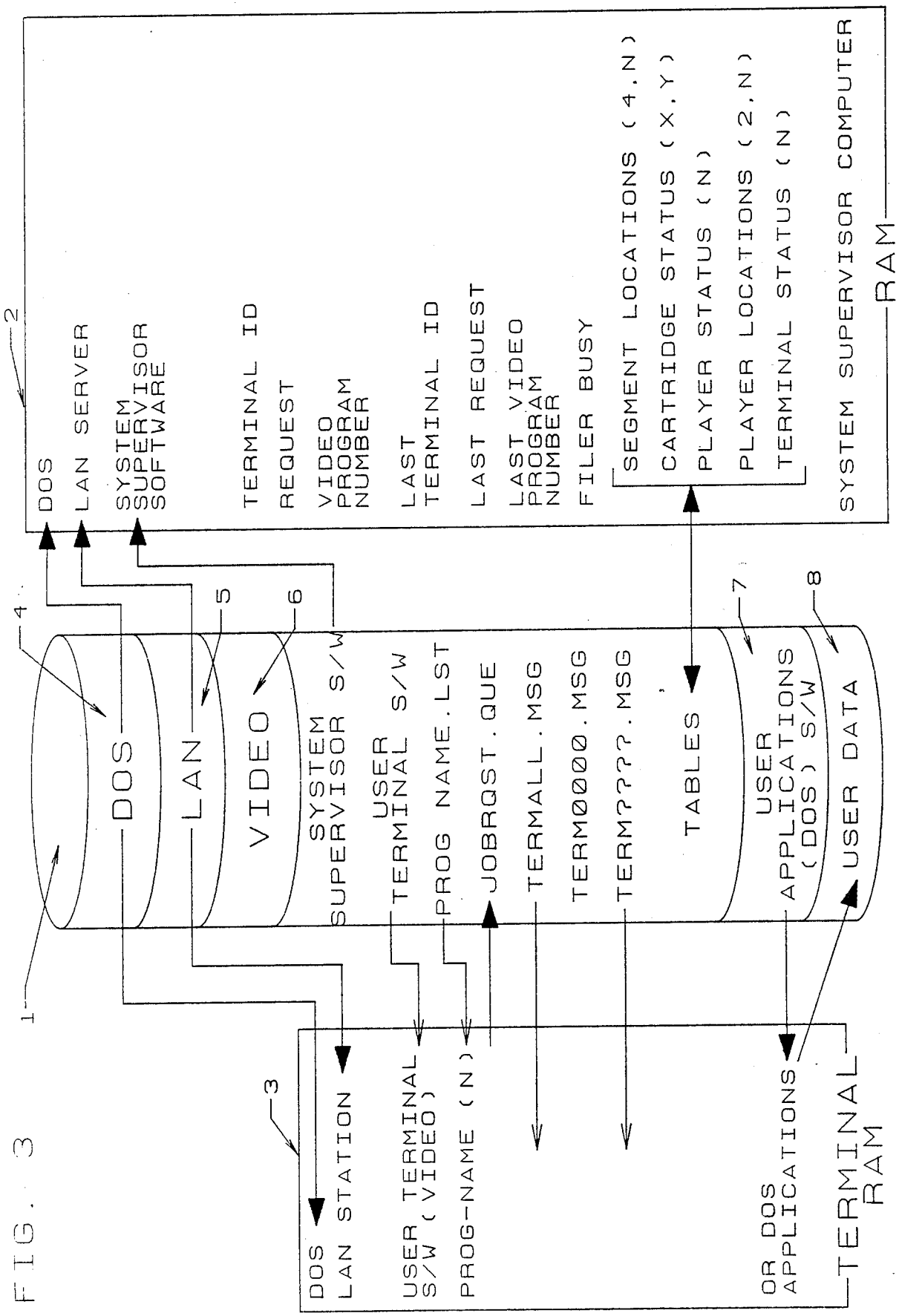
FIG. 3 is a diagram illustrating the hard disk storage and memory locations of the system's software and data.

FIG. 3 depicts sharing the software and data storage among the various components. The LAN allows the system supervisor computer's hard disk drives 1C and other devices to be shared with all other computers (user terminals) connected to the system. Depending on the particular application, more than one hard disk may be used; some system applications will require controlled (limited) access by user terminals to the system resources. Since DOS and LAN software allow control of user access to the system's disk drives and other devices, the system operator can authorize or prohibit access as necessary.

The hard disks in the system store DOS, the LAN software, the system programs and data, applications software, and user data.

On system startup, the system supervisor computer 1 boots DOS from the hard disk 1C and initializes the local area network; it then begins running the system supervisor software which processes video requests. When a user terminal 8 is turned on, it also boots DOS from the hard disk 1A (unless a bootable diskette is in an optional terminal diskette drive). After bootup, the terminal loads the video terminal software, which allows the selection of video segments.

DOS and the LAN software facilitate the transfer of programs and data between the computers and their disk drives and between other computers. If authorized by the system operator, users may run applications software such as word processing and data base programs. Also with authorization, users may store their data files on an area of the hard disk 1C.

FIGS. 4-11 show various tables that are utilized in execution of the programs used in the system according to the software present invention. In the preferred embodiment of the system, the n elements of the video program names table (FIG. 4) are strings of 38 bytes each, where n equals the number of video programs. The table contains the names of the video programs accessible from the user terminals. When a terminal begins running the user interface software, it loads the table from a disk file of the same format (38 byte records, 1 field per record).

FIG. 5 illustrates the software processing queue file procedure used in the present invention. The user terminals send video requests to the system supervisor software via the job request queue file; the system supervisor software communicates with the user terminals through terminal message files.

The first field of each record in the job request queue file is a two-byte integer that represents the I.D. number of the terminal that issued the request. The second field, a two-byte string, contains a coded request such as "B" for Begin Job, "E" for End Job, "FR" for Filer Ready, etc. The request's video program number is placed in the third field, which is also a two-byte integer. When a terminal issues a request, the terminal I.D., coded request, and video program number are written to a new record at the end of the queue. As the system supervisor software processes the requests, it deletes the request records from the queue file. Not only do the terminals write requests to the queue file, but also the supervisor software itself places job requests in the file. This ability allows the supervisor to process several jobs virtually concurrently; while one job is waiting for a condition to be met (such as cartridge mounted), the system supervisor software may begin processing a new request.

Each terminal has assigned to it a terminal message file name based on its terminal I.D. number. For example, the terminal with I.D. number twenty-three has a message file named TERM0023.MSG. When awaiting a system response to a request, the user terminal software monitors its message file. The system supervisor software writes messages to the terminal message file (a simple ASCII text file); if the file does not exist, the supervisor software creates it. The user terminal reads the message file and responds as directed by the supervisor software. The special message file, TERMALL.MSG communicates to all user terminals 8; another, TERM0000.MSG maintains messages for the master user terminal 6.

FIG. 6 illustrates the arrangement of a segment locations table also utilized in the software procedure. The two dimensional (4,n) segment locations table consists of four integers for each of the n video segments in the system. The four integers hold values for the Cartesian (x and y) coordinates of the segment's cartridge and for both the segment position (on the cartridge) and the segment length. On system start-up, the system supervisor software loads the segment location data from a hard disk file.

FIG. 7 illustrates a two dimensional table, the cartridge status table, which has an integer element for each shelf location. The table is indexed by the Cartesian coordinates of the actual shelf location. For example, the shelf at the third column and seventh row is accessed by coordinates (x=3, y=7). The element's value equals zero if the cartridge is not in use (and thus, in the shelf); if the value is not zero, it represents the number of the player that is playing the cartridge.

FIG. 8 illustrates the player status table which has one dimension of n integer elements where n is the number of video players. The table is indexed by player number. The system supervisor software scans through the table to find an available player 11 whenever necessary. The element's value is zero if the player 11 is available; otherwise its value equals the I.D. of the terminal that is using the player.

Indexed by player number, the two dimensional integer table shown in FIG. 9, provides the Cartesian coordinates of each player 11.

The terminal status table of FIG. 10 has one dimension of n integer elements where n is the number of user terminals. The table is indexed by terminal number. The element's value is zero if the terminal is idle (not viewing a video segment); otherwise its value equals the video program number being viewed.

Figure 11:
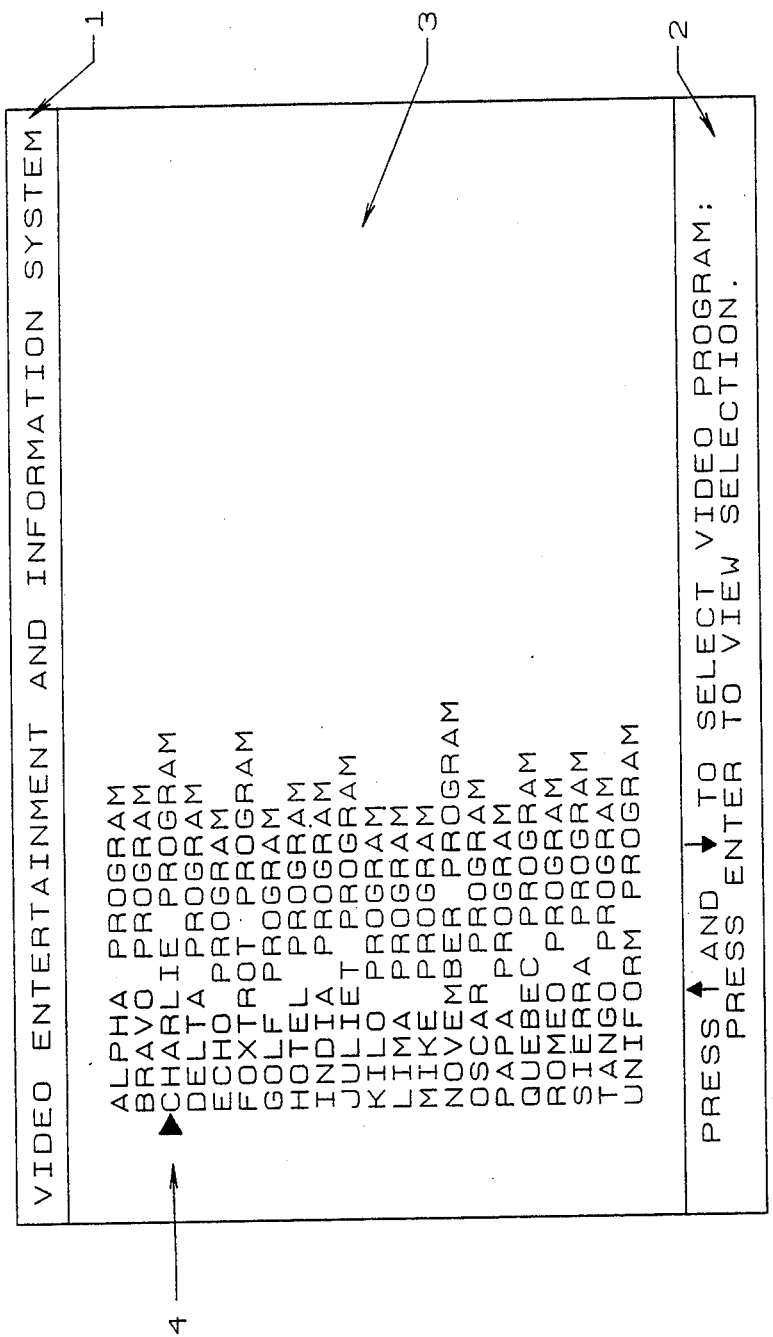
FIG. 11 is a view of the user terminal software screen format.

FIG. 11 is a reproduction of the user terminal screen as the user sees it while selecting a video program. The title bar 18 can easily be customized by the system programmer; the name of the installation (hotel name, for example) is a likely choice. The multi-line message box 21 displays instructions and system supervisor responses to the user. Normally, the box will contain the two-line message "Press (up arrow) of (down arrow) to select video program; / press Enter to view selection." A response message from the system supervisor might be, "The video program you have selected / will be shown momentarily... please stand by," or it might read, "The selected video program is / unavailable at this time; please / select another or try again later. / Press any key to continue."

The video program name list 19 is displayed between the title bar and the message box. The selection pointer 20 moves up and down the screen as directed by the user when he presses the up arrow or down arrow keys. If the pointer is on the top line and the up arrow is pressed, the entire list scrolls down to reveal the program name(s) above the previously displayed top line. Likewise, if the pointer is on the bottom line and the down arrow is pressed, the entire list scrolls up to reveal the program name or names below the previously displayed bottom line.

When the user presses Enter, the video program number is calculated; the terminal software then sends a Begin request to the system supervisor.

Figure 12:
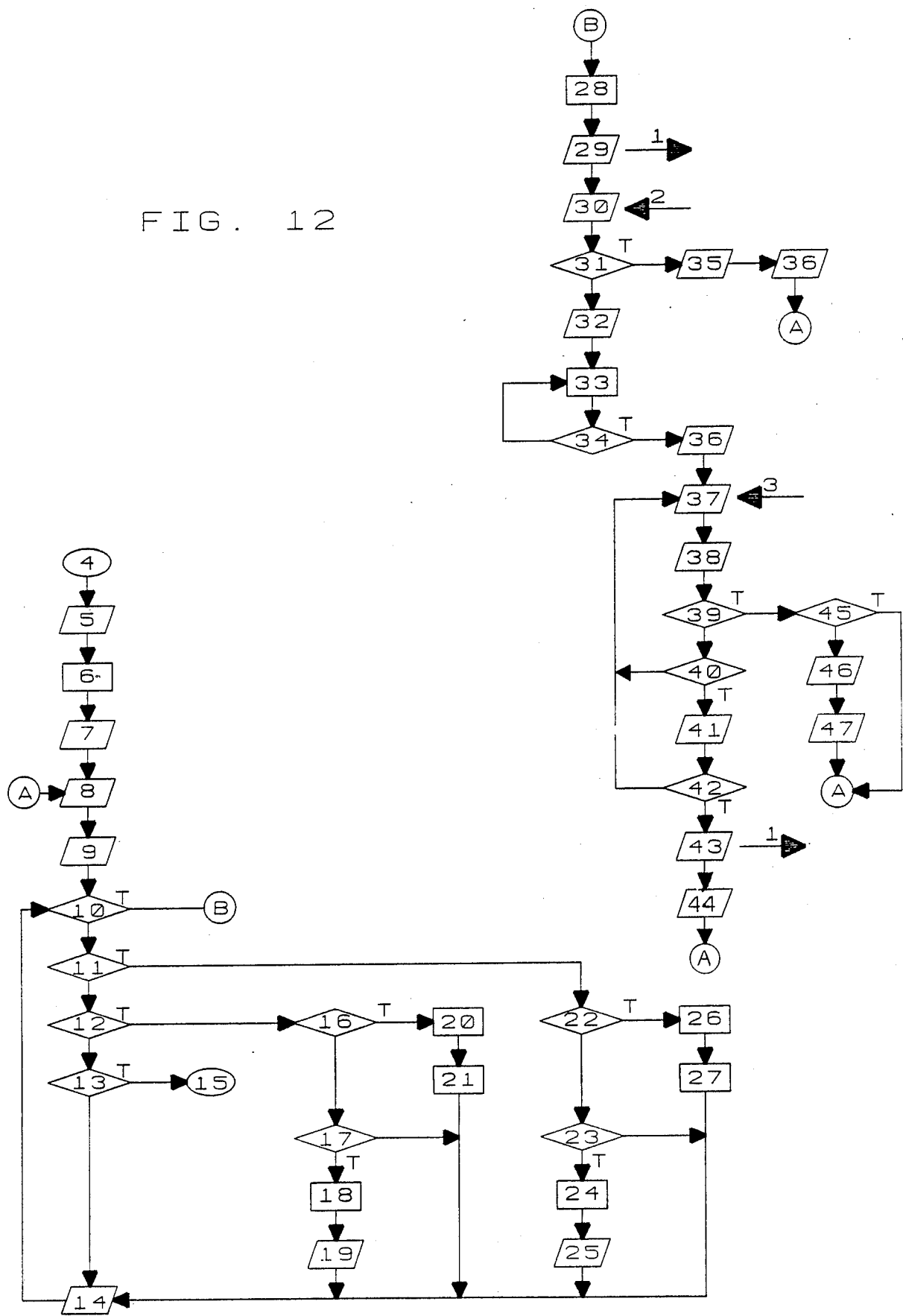
FIG. 12 is a flow chart showing the logic of the user terminal software.

FIG. 12 is a flow chart representing the logic of the user terminal software. The chart that begins at A (on the left) represents the program code that allows the user to move the selection arrow up and down the screen, lets him to scroll the entire list up and down, and allows him to request any selected video program to be shown. The chart on the right of FIG. 12, which begins at B, shows the process of calculating the video program number, issuing a Begin request to the system supervisor, and displaying the video. The following list identifies the function of each operation in the logic charts:

1. Output: a request to begin the selected video program number is written to the job request queue file via the LAN.
2. Input: a response from the system supervisor is read from the terminal's message file via the LAN.
3. Input: the terminal message file is monitored for messages from the system supervisor.
4. Process begins.
5. Load list of video program names from PROGNAME.LST file on system hard disk.
6. Set selection arrow to line 1; set scroll offset to 0.
7. Display screen template (title bar and message box).
8. (A) Display video program names (normally 22, depending on size of message box).
9. First (priming) user input: up arrow, down arrow, Enter, of ESCape.
10. If user input is Enter, perform (B) routine that communicates with system supervisor.
11. If user input is up arrow, move the selection pointer or scroll the list as necessary.
12. If user input is down arrow, move the selection pointer or scroll the list as necessary.
13. If user input is ESCape, stop the program.
14. User input: up arrow, down arrow, Enter, or ESCape.
15. Halt program execution.
16. If selection pointer position is less than 22 then move pointer else scroll screen.
17. If scroll offset less than the number of video programs-21 (therefore, not at the bottom of the list), then scroll up.
18. Increment scroll offset.
19. Scroll screen up 1 line.
20. Increment selection pointer position.
21. Move selection pointer to new position. Erase old arrow.
22. If selection pointer position is less than 22 then move pointer else scroll screen.
23. If scroll offset greater than zero (therefore, not at the top of the list), then scroll down.
24. Decrement scroll offset.
25. Scroll screen down 1 line.
26. Decrement selection pointer position.
27. Move selection pointer to new position. Erase old pointer.
28. Calculate video program number, the sum of the scroll offset and the selection pointer position.
29. Write Begin request to job request queue file.
30. Read terminal message file for response message from supervisor.
31. If response message indicates an error, report the error and restart.
32. Set tuner to assigned (via terminal message from supervisor) frequency.
33. Monitor video cable for existance of video signal.
34. If signal exists then continue processing; otherwise, continue monitoring for signal.
35. Report error message to user. Prompt, "Press Enter to continue...".
36. Clear screen of text and display video as tuned.
37. Monitor terminal message file for message, such as end-of-segment, from system supervisor.
38. Monitor keypad for user interuption.
39. If a terminal message exists, process it.
40. If a user interuption occured, process it.
41. Ask user, "Do you wish to stop the video?"
42. If user answers, "Yes", then write an End request.
43. Write an End request to job request queue file.
44. Prompt User to press key to continue. Await message acknowledgement from user (any key pressed).

45. If system sent "end-of-segment" message then return to selection screen; otherwise process error message from system.

46. Report error message to user. Prompt, "Press Enter to continue. . . ".

47. Await message acknowledgement from user (any key pressed).

Figure 13:
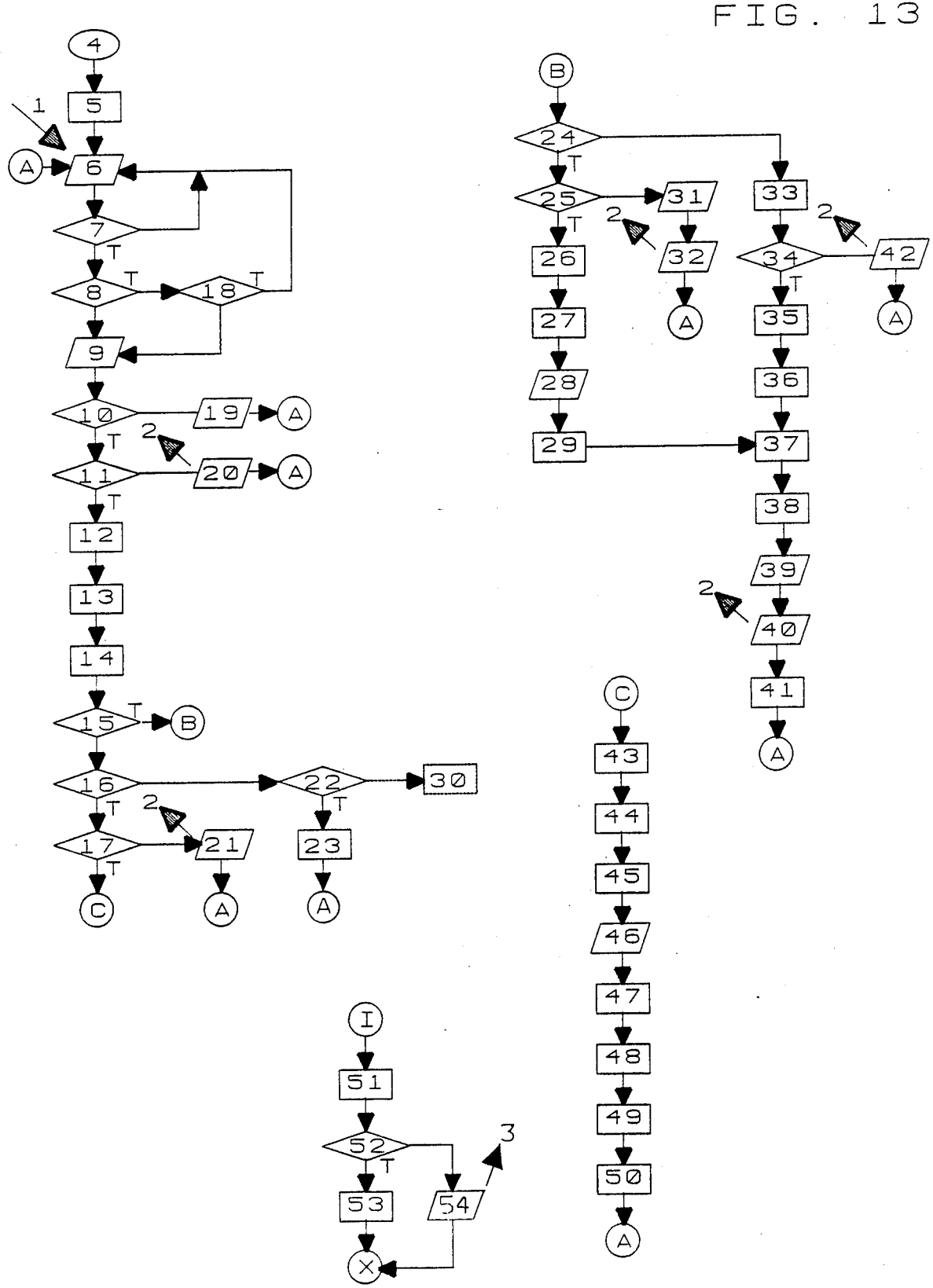
FIG. 13 is a flow chart depicting the logic of the system supervisor software.

FIG. 13 is a flow chart representing the System Supervisor Software Logic Charts.

A Repeat user input process.
B Process a begin request.
C Process an end request.
I Process filer interrrupt.
X Return from the interrupt (resume execution).
1 Input: a request from a user terminal.
2 Output: write a response message to the terminal's message file.
3 Output: end-of-segment message to terminal message file.
4 Start system supervisor.
5 Initialize: files, tables, flags and pointers.
6 Read a record from job request queue file.
7 Does a request record exist?
8 Is it a filer request?
9 Delete the record from job request queue file.
10 Is it a valid terminal ID number?
11 Are the request and video program numbers valid?
12 Look up the terminal status in the table.
13 Look up the segment location data in the table.
14 Look up the cartridge status in the table.
15 Does the request=Begin?
16 Does the request=End?
17 Is the terminal status equal to busy?
18 Is the filer busy?
19 Notify the system (Log Error) of an invalid user.
20 Write error message to user terminal message file.
21 Write "Ready" message to user terminal message file.
22 Does the Request=Show?
23 Start player.
24 Is the terminal status not equal to idle?
25 Is the old cartridge not equal to new cartridge?
26 Look up the player location in the player locations table (by player number).
27 Look up the shelf location for the old cartridge in the segment location table.
28 Command filer to dismount cartridge from player and transfer the cartridge to its storage shelf.
29 Set the old cartridge status to available.
30 Process other requests.
31 Command player to seek segment position and to play segment.
32 Write "Tune" message with player number to the terminal message file.
33 Scan the player table for available player number.
34 Is the player available?
35 Look up the player location in the player locations table.
36 Set the player status to ID number of requesting terminal.
37 Set the new cartridge status to the player number.
38 Set the terminal status to video program number.
39 Command filer to retrieve the new cartridge; mount in player.
40 Write the "Tune" message to user terminal.
41 Set the filer status to busy.
42 Write Error Message (player unavailable) to user message file.
43 Look up the player number in the cartridge status table.
44 Look up the player location in the player locations table (by player number).
45 Look up the shelf location for cartridge in the segment locations table (by video number).
46 Command filer to dismount cartridge from player and to carry it to its shelf position for storage.
47 Set the terminal status to idle.
48 Set the player status to avaiable.
49 Set the cartridge status to available.
50 Set the filer to busy.
51 Process the interrupt.
52 Is it a filer request?
53 Set the filer status to not busy.
54 Write "end of segment" message to terminal message file.

Figure 14:
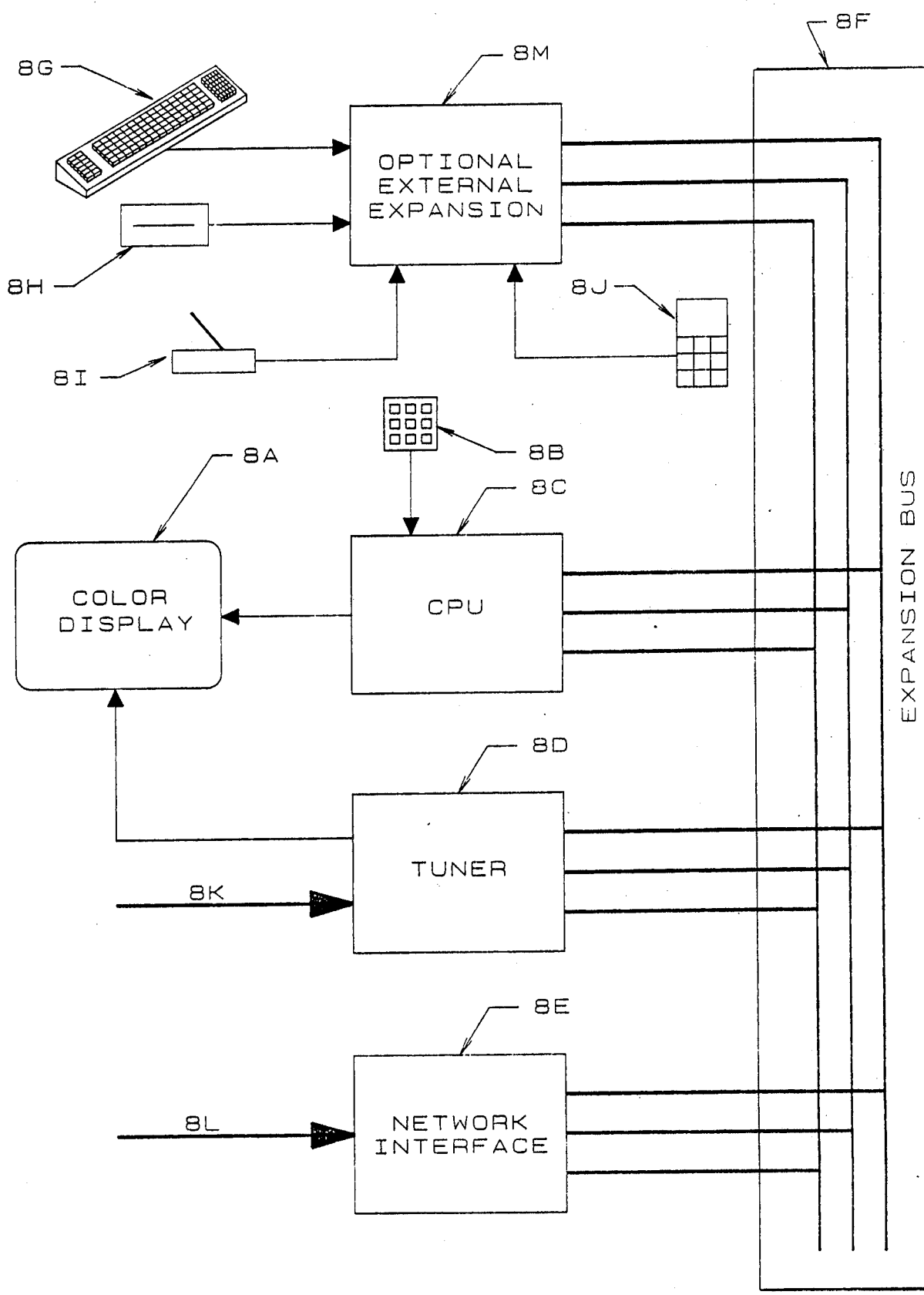
FIG. 14 is a block diagram of the component and optional components in the user terminal.

Shown diagrammatically in FIG. 14, the User Terminal 8 consists of a microcomputer 8C, a color graphics display 8A, a user input keypad 8B, a computer controlled digital frequency tuner 8D, LAN interface 8E, expansion bus 8F, and optional input/output devices. Options include a full-function, alphanumeric keyboard 8G, printer (not shown), hard disk drive 8H, game input device 8I, and remote controlled receiver with transmitter 8J.

The MS-DOS compatible microcomputer 8C (MS-DOS compatible such as 8088) accepts input from both the user input devices and the input/output devices of the expansion bus. The microcomputer's Random Access Memory (RAM) serves as working storage for video software, applications software, and data. Data from the system supervisor computer 1 and from the terminal's own diskette and hard disk drives is loaded into RAM as requested by the terminal's microprocessor. Read Only Memory (ROM) permanently stores the Basic Input/Output System (BIOS) and other optional firmware. The firmware may provide means for the terminal to boot from the hard disk on the system, supervisor computer.

The color monitor 8A displays both full motion video and computer text/graphics. The monitor 8A receives the video signal (NTSC in the U.S.) from the digital frequency tuner 8D, and the microcomputer 8C directs high resolution RGB (red-green-blue) text and graphics to the screen of monitor 8A. An optional device, (not shown) the overlay adaptor allows simultaneous display of video and computer text/graphics.

The user input keypad 8B, which may be wireless, need only consist of a few keys depending on the complexity of the user terminal software.

The digital frequency tuner 8D demodulates the video signal for the monitor 8A from any of the system's video channels (set frequencies); the microcomputer 8C controls the tuner 8D as instructed by the system supervisor 1 via line 8K and by the user terminal software.

The LAN interface 8E provides the terminal microcomputer 8C with access to shared devices (hard disks, printers, etc.) of the system supervisor computer 1. The interface may access data with coax cable, fiber optic cable, or the multiple-channel video transmission cable 8L.

Accessible from the exterior of the terminal, the optional external expansion 8M is a practical way of allowing users to connect peripherals.

Figure 15:
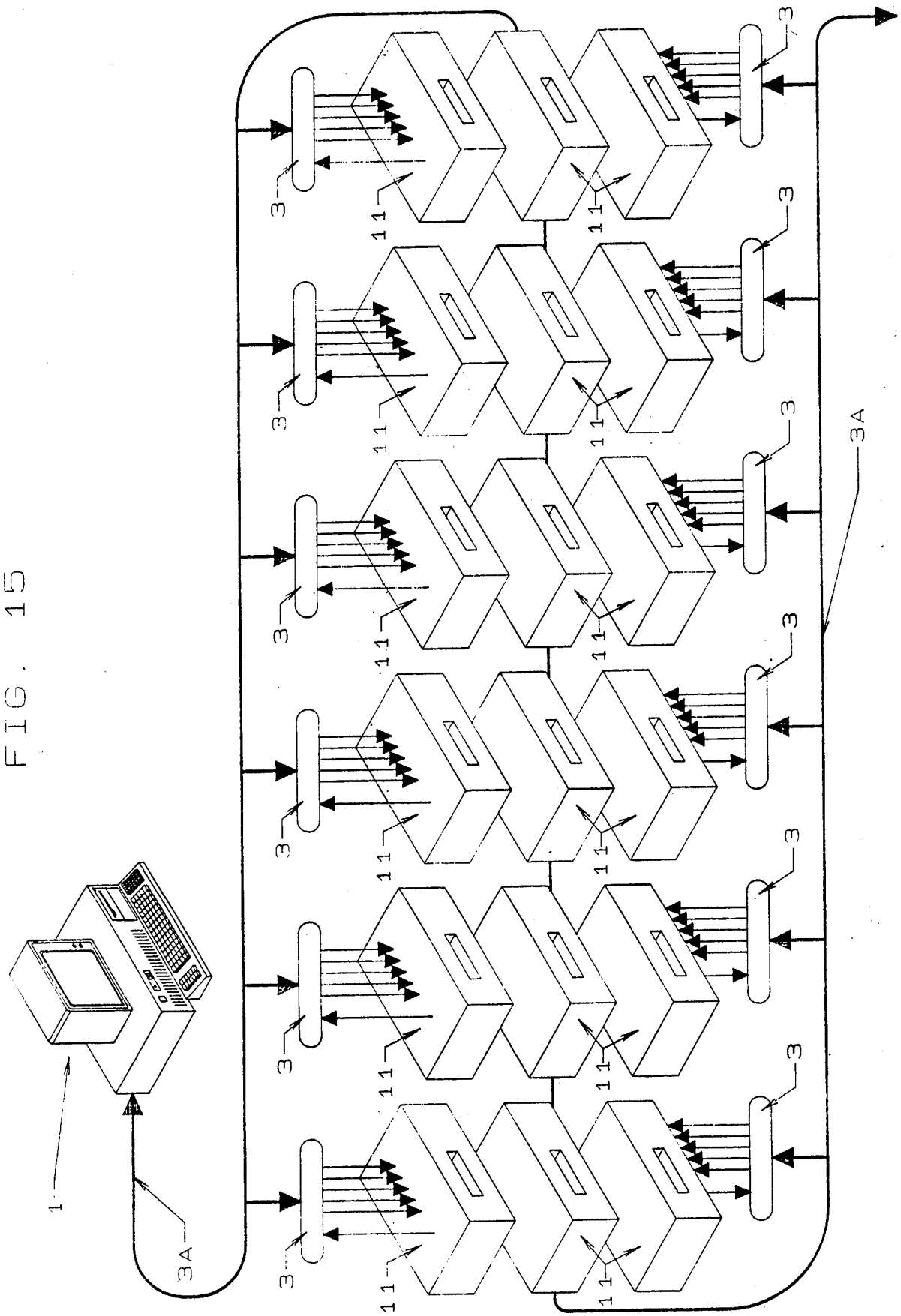
FIG. 15 is a diagram of the video player network showing system supervisor computer, network cable, microprocessor based controller and players.

Referring to FIG. 15 the player controller network 3, a LAN, consists of the Network Interfaces for system supervisor computer 1 and Player Controller Network 3, the network cable 3A, and the video players 11.

Using the player controller cable network 3A the System Supervisor computer 1 commands any player 11 in the network as necessary to complete processing and user video requests. Depending on the size and configuration of the player controller network 3, the network cable 3A may be variously configured, i.e., coax or twisted pair, etc.

The major components of the player controller network 3 are micro computers having a system board with both a network interface and player interface (not shown). The network interface of the player controller network 3 receives system supervisor computer 1 player commands—(segment position and length parameters) as well as status report requests. The player commands are in turn directed to the player 11 via the player interface. Status reports are returned directly to the system supervisor computer 1 through the network 3.

Figure 16:
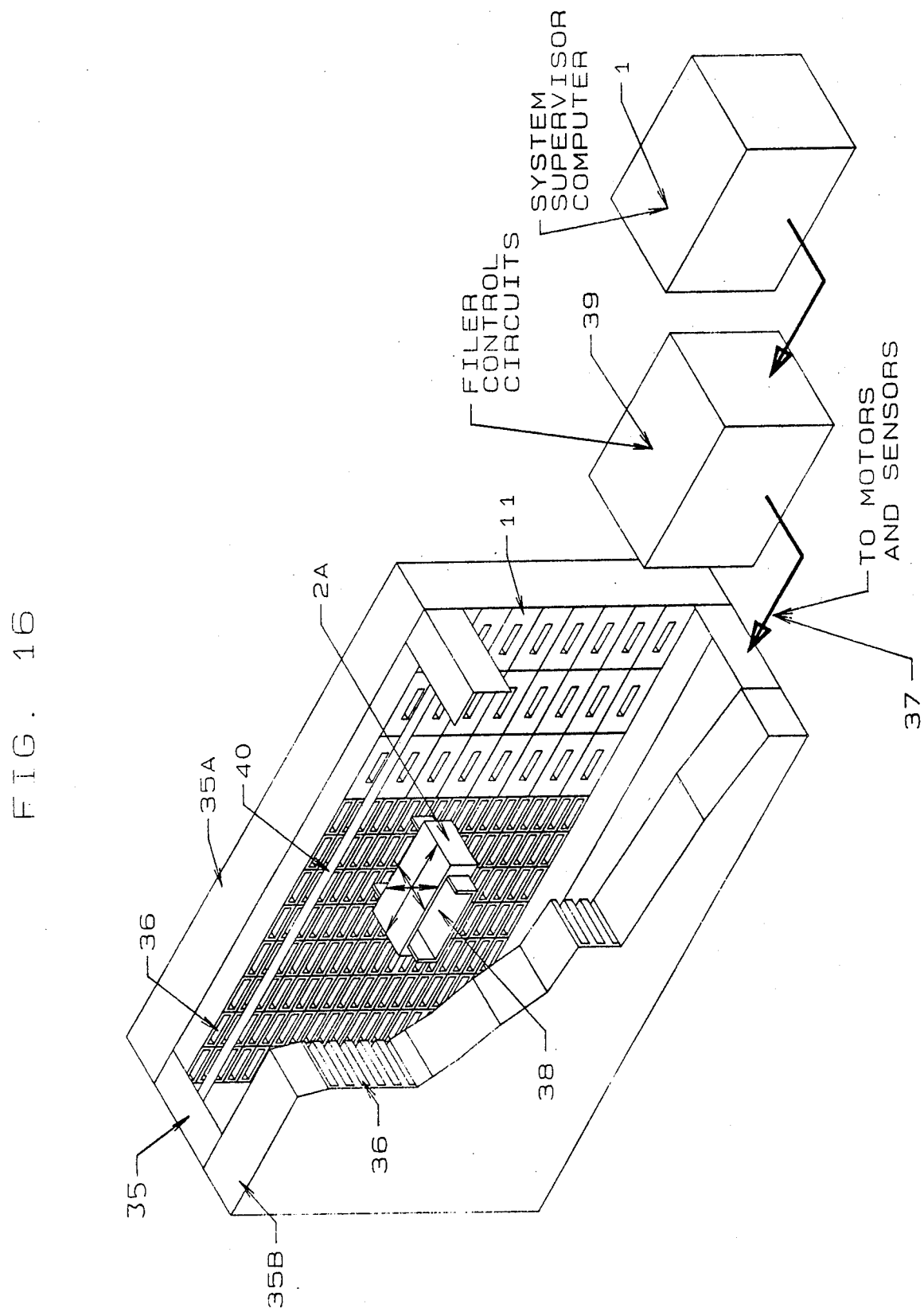
FIG. 16 is a fragmentary isometric view of the video filer storage housing showing players and stored cartridges and showing a diagrammatic representation of the filer carriage, and control circuitry.

The filer 2 components are illustrated in FIG. 16.

The filer 2 includes a housing 35 comprised of spaced apart sections 35A, 35B, each defining a planar array of storage sites 36, open ended and configured to receive a discrete data record item such as the video tape cartridges, and mounting a plurality of players 11 adjacent thereto. The carriage 2A is mounted for movement in the X-Y directions powered by a primary transport means, not shown in FIG. 16, but including motors and position sensors to be positioned opposite a particular storage site 36, or player 11. A secondary transport means also not shown but including motors and position sensors enables bidirectional movement of a carriage tray 38 along the horizontal Z axis to allow a retriever device to extract a record item in the particular storage site 36 in either housing segment 35A, 35B, or to enable deposit of a returned item therein, or to extract or deposit an item from or into a player 11.

The carriage 2A movement is controlled by any suitable filer control circuit 39, activating stepper motors and responding to position sensors. Suitable controller circuits are commercially available for multiaxis devices, such as the MAC 100, based on an 8031 chip, and various converters and stepper motor driver boards. See U.S. Pat. No. 4,608,679 for transport system description including position feed back sensors of a type generally suitable to control the carriage 2A and retriever device.

The control circuit 39 is in turn controlled by commands from the system supervisor computer 1, as described above.

Figure 17:
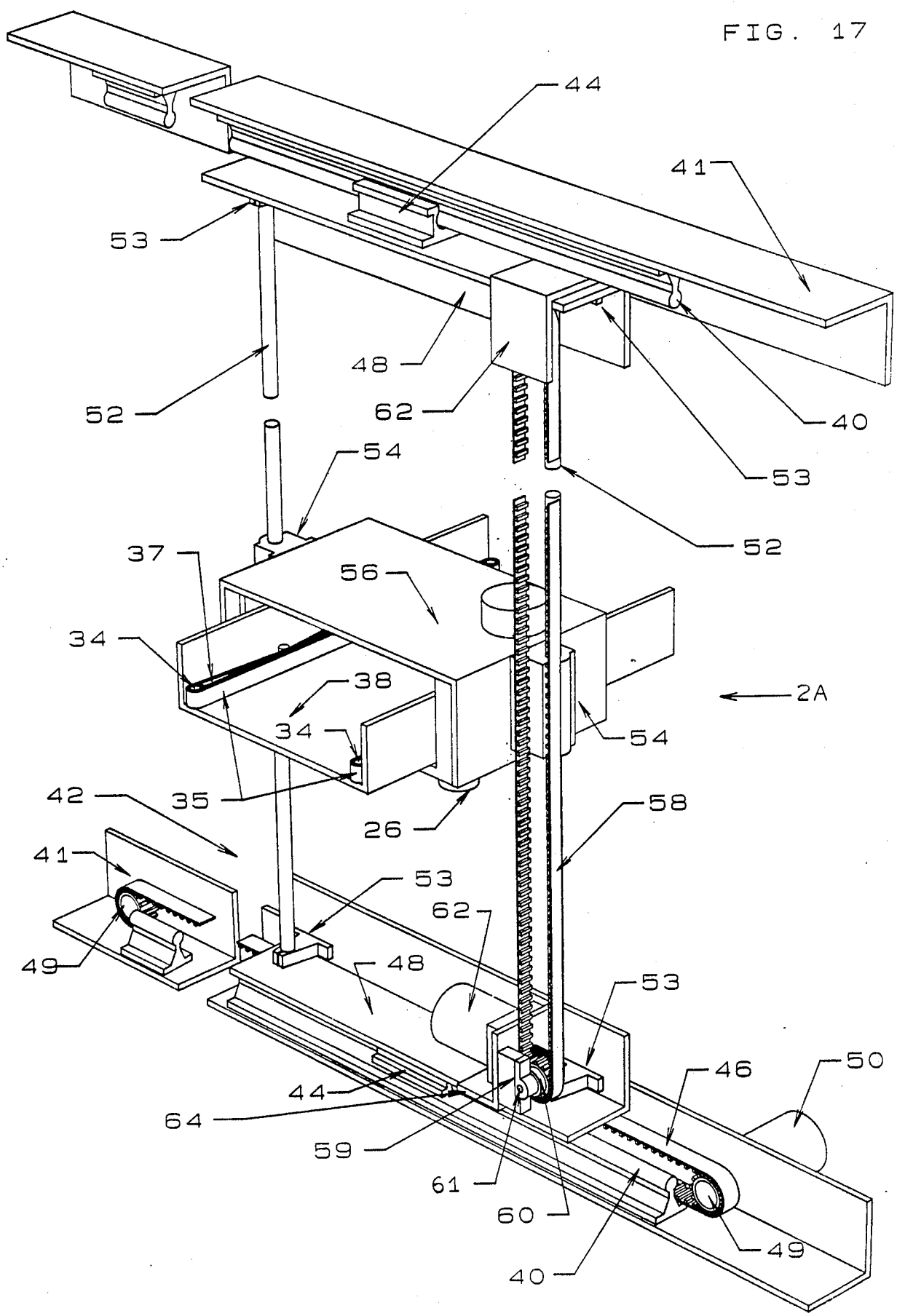
FIG. 17 is a simplified isometric fragmentary view of the carriage and horizontal and vertical position primary transport mechanism contemplated as being incorporated in the filer used in the system according to the present invention.

FIG. 17 illustrates in simplified form the primary transport system contemplated for movement in the X-Y directions in a vertical plane parallel to the array of storage sites 36 and players 11.

This includes upper and lower guide rails 40 mounted on housing frame members 41 extending along the X-axis, slidably supporting by a carrier frame 42, as by means of slides 44. An endless drive belt 46 supported on mating toothed pulleys 49 and extending the length of the X-axis is shown as only attached to lower angle plate 48 although in practice both upper and lower angle plates would be driven. Drive belt 46 is driven by an X-axis stepper motor 50 driving one of the toothed pulleys 49, and is attached to angle plate 48 to be thereby powered along the X-axis.

The carrier frame 42 includes a spaced pair of parallel guide rods 52 attached with clamping brackets 53 at either end to a respective angle plate 48 to form a unitary structure.

The carriage 2A is slidably mounted on the guide bars 52 by pillow blocks 54 attached to either side of a rectangular carriage housing 56, so that the entire carriage 2 is movable up and down along the Y-axis. This movement is powered by a vertically extending toothed drive belt 58 passing around toothed pulleys 60 at either end, supported on shafts 61 rotatably supported by bearing blocks 59 secured to brackets 64. Lower pulley 60 is driven by a Y-axis motor 62 mounted on bracket 64 to thereby drive belt 58.

Belt 58 is attached to the carriage housing 56 so as to be carried therewith along the Y-axis by energization of the motor 62.

The carriage tray 38 is slidably mounted in the carriage housing 56 and secondary transport means enables controlled powered movement towards and away from either housing section 35A, 35B, as will be described hereinafter.

Figure 19:
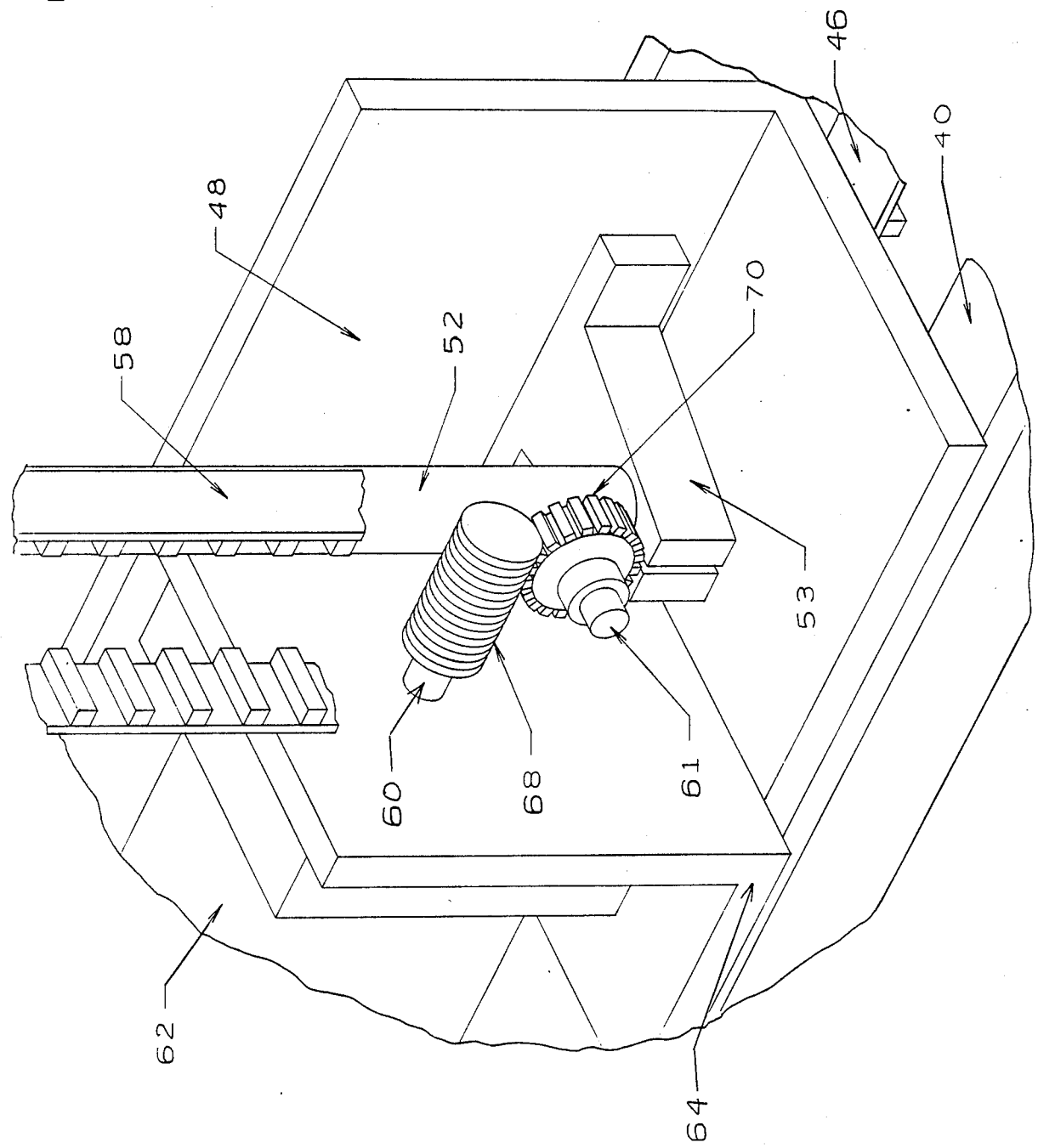
FIG. 19 is an enlarged isometric view of a portion of the primary transport mechanism shown in FIG. 17.

FIG. 19 shows the additional details of the drive between the motor 62 and pulley 60, in which a worm 68 is affixed to the output shaft of motor 62. Worm 68 in turn is meshed with a worm gear 70 affixed to a shaft 61 which also is affixed to the pulley 60 (not shown in FIG. 19), to thereby be driven.

Figure 18:
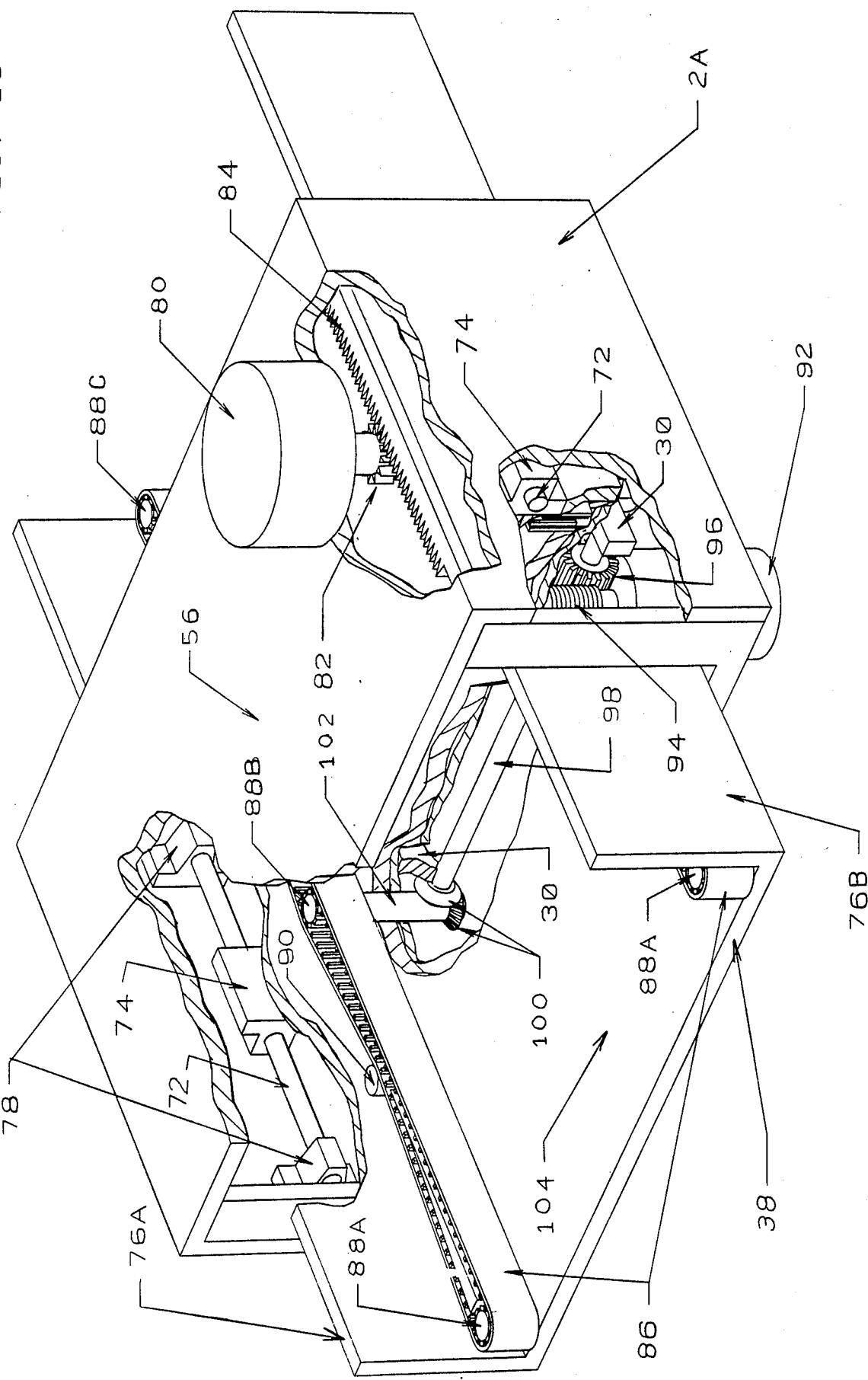
FIG. 18 is an enlarged broken away isometric view of the carriage showing details of the carrier secondary transport mechanism and retriever tray gripper mechanism.

FIG. 18 illustrates further details of the carriage 2A, secondary transport means, and gripper. The carriage tray 38 is supported on parallel guide bars 72 by slides 74, the ends of the guide bars 72 secured with brackets 78 affixed to the carriage housings 38.

The tray 38 is driven by secondary transport means comprised of a Z axis motor 80 driving a primary gear 82 in mesh with a gear rack 84 affixed to wall 76B of the carriage tray 38. Actuation of the motor 80 thus causes drive of the carriage tray 38 in either horizontal direction towards and away from either housing section 35A, 35B on guide bars 72.

A gripper arrangement is provided which when brought into engagement with a cartridge advances the same into a carriage cavity 104 defined by the region between the tray walls 76A, 76B.

The gripper arrangement includes a pair of parallel toothed gripper belts 86 located adjacent a respective side wall 76A, 76B, each circulating around idler end pulleys 88A, 88C and intermediate drive pulley 88B. A tensioner wheel 90 is also provided to insure tightness in each gripper belt 86.

Each drive pulley 88B is driven by a motor 92 driving an output worm 94 in turn meshed with a worm gear 96 affixed to a cross shaft 98 supported on blocks 30 beneath the bottom of carriage tray 38.

A pair of mating level gears 100 are affixed respectively to cross shaft 98 and vertical shaft 102 affixed to the drive pulley 88B on the left side of carriage tray 38. The drive pulley 88B on the right side is directly driven by motor 92.

The length of the carriage tray 38 and the gripper belts 86 is preferably selected so as to enable several video cartridges to be accommodated. Thus, several cartridges may be retrieved and transported to and from the storage sites 36 and players 11, so as to improve the efficiency of the storage and retrieval operation.

The bidirectional movements between each of the housing sections 35A, 35B also provide enhanced speed of operations.

Thus, the present system enables a great number of remote user terminals to quickly access a central stored library of data stored or discrete record items, such as video tape cartridges, and other audio video signal sources, without utilizing player equipment at each remote location or the bulk transfer of data to the remote location.

The system is also adaptable to a variety of data record item formats, such as discs, tapes, etc. and various configurations of user terminals, files, etc.

I claim:

1. A system for providing selective random access to a library of segments of prerecorded audio-video data for display at any of a plurality of remote locations, the system comprising:

a plurality of user display means, one at each of said remote locations for displaying an audio video signal at said location;

an audio-video data library comprising a plurality of discrete audio-video record items, each containing prerecorded audio-video data;

filer means including a housing having a plurality of storage sites each adapted to receive an audio-video data record item;

a plurality of playback devices located at said filer means, each adapted to generate an audio-video signal from an audio-video record item operatively associated therewith;

a cable network interconnecting said playback devices and user display means for the purpose of transfering audio-video signals between playback devices and user display means;

retriever means operatively associating any selected record item in a storage site with an available one of said playback devices for playback, and disassociating said record item there from after playback;

selection means including a user interface means included in each user display means for selecting a particular segment of audio-video data in said library for playback, said selection means further including means controlling said retriever means to cause a particular record item having said particular segment of audio-video data thereon to be played back by an available one of said playback devices and causing said audio-video signal to be read out at said user video display means at said location whereat said selection is made;

signal combiner means causing said generated audio-video signals from each playback device to be transmitted onto said cable network at a unique frequency;

each of user display means including tuner means able to tune to any of said frequencies transmitted onto said cable network and demodulate signals from a single playback device;

supervisory computer means monitoring the availability of playback devices and audio-video record items and causing said retriever means to transport a selected data record item to an available playback device;

a data communications network separate from said cable network interconnecting said user display means, said playback devices, and said supervisory computer means for the purpose of internal system communications;

said supervisory computer means also including means for causing said user display means at said location to tune to said frequency of said assigned playback device by sending instructions via said data communications network.

2. The system according to claim 1 wherein all of said user display means are connected into both said data communications network and said audio-video cable network.

3. The system according to claim 1 wherein said supervisory computer means and data communications network allow electronic tuning to associate additional audio-video signal sources transmitted over said cable network by said signal combiner means also at fixed unique frequencies to said user display means.

* * * * *